US011409635B2

(12) United States Patent
Rose

(10) Patent No.: US 11,409,635 B2
(45) Date of Patent: Aug. 9, 2022

(54) HACKER-RESISTANT ANTI-DEBUG SYSTEM

(71) Applicant: Raytheon Company, Waltham, MA (US)

(72) Inventor: Daniel S. Rose, Salado, TX (US)

(73) Assignee: Raytheon Company, Waltham, MA (US)

( * ) Notice: Subject to any disclaimer, the term of this patent is extended or adjusted under 35 U.S.C. 154(b) by 530 days.

(21) Appl. No.: 16/550,056

(22) Filed: Aug. 23, 2019

(65) Prior Publication Data

US 2021/0056008 A1  Feb. 25, 2021

(51) Int. Cl.
| G06F 11/36 | (2006.01) |
| G06F 11/30 | (2006.01) |
| G06F 12/02 | (2006.01) |
| G06F 21/14 | (2013.01) |
| G06F 9/455 | (2018.01) |

(52) U.S. Cl.
CPC ...... *G06F 11/3656* (2013.01); *G06F 11/3096* (2013.01); *G06F 12/0253* (2013.01); *G06F 21/14* (2013.01); *G06F 2009/45591* (2013.01)

(58) Field of Classification Search
None
See application file for complete search history.

(56) References Cited

U.S. PATENT DOCUMENTS

| 7,243,340 B2 | 7/2007 | Tobin |
| 7,383,583 B2 | 6/2008 | Marr et al. |
| 8,271,803 B2 | 9/2012 | Goldsmid et al. |
| 8,356,356 B2 | 1/2013 | Sabella et al. |
| 2005/0198526 A1* | 9/2005 | Marr ............ G06F 21/14 726/22 |
| 2007/0234430 A1 | 10/2007 | Goldsmid et al. |

(Continued)

FOREIGN PATENT DOCUMENTS

| CN | 104504312 A | 4/2015 |
| CN | 105793860 A | 7/2016 |

(Continued)

OTHER PUBLICATIONS

"International Application Serial No. PCT US2020 039122, International Search Report dated Oct. 5, 2020", 5 pgs.

(Continued)

*Primary Examiner* — Qing Chen
(74) *Attorney, Agent, or Firm* — Schwegman Lundberg & Woessner, P.A.

(57) ABSTRACT

A computer system includes an operating system, a memory coupled to the operating system, and a processor (e.g., an anti-debug processor) coupled to the operating system. The operating system receives, from a debug process, a request to create an essential debug object for attachment to a target process. The anti-debug processor scans a kernel memory of the operating system for the essential debug object and verifies a presence of the essential debug object in the kernel memory, and scans the kernel memory to identify a process that has stored in the kernel memory the essential debug object. The anti-debug processor then halts the debug process, without using an internal interface or function of the operating system, thereby preventing the debug process from attaching to the target process.

20 Claims, 3 Drawing Sheets

(56) References Cited

U.S. PATENT DOCUMENTS

| | | | | |
|---|---|---|---|---|
| 2008/0184198 | A1* | 7/2008 | Sabella | G06F 21/554 717/110 |
| 2014/0259162 | A1* | 9/2014 | Matenaar | G06F 21/52 726/22 |
| 2016/0300044 | A1 | 10/2016 | Nam et al. | |

FOREIGN PATENT DOCUMENTS

| | | |
|---|---|---|
| CN | 106055983 A | 10/2016 |
| CN | 106650338 A | 5/2017 |
| CN | 106778104 A | 5/2017 |
| CN | 106845170 A | 6/2017 |
| CN | 107092828 A | 8/2017 |
| CN | 107133503 A | 9/2017 |
| CN | 107239698 A | 10/2017 |
| CN | 107463836 A | 12/2017 |
| CN | 108388778 A | 8/2018 |
| CN | 108629163 A | 10/2018 |
| CN | 105653908 B | 12/2018 |
| CN | 107103214 B | 12/2019 |
| JP | 2016538641 A | 12/2016 |
| KR | 100781554 B1 | 12/2007 |
| KR | 100939210 B1 | 1/2010 |
| KR | 100949949 B1 | 3/2010 |
| KR | 101519845 B1 | 5/2015 |
| KR | 101657950 B1 | 9/2016 |
| KR | 20160107712 A | 9/2016 |
| KR | 101861952 B1 | 5/2018 |
| WO | WO-2015072689 A1 | 5/2015 |
| WO | WO-2021040866 A1 | 3/2021 |

OTHER PUBLICATIONS

"International Application Serial No. PCT US2020 039122, Written Opinion dated Oct. 5, 2020", 7 pgs.

Amani, Ibrahim S, "Identifying OS Kernel Objects for Run-Time Security Analysis", Network And System Security, Springer Berlin Heidelberg, Berlin, Heidelberg, (Nov. 21, 2012), 72-85.

Dongyang, Zhan, "A Low-overhead Kernel Object Monitoring Approach for Virtual Machine Introspection", arxiv.org, Cornell University Library, 201 Olin Library Cornell University Ithaca, NY, (Feb. 13, 2019).

Shields, Tyler, "Anti-Debugging—A Developers View", [Online], Retrieved from the Internet: URL: https: www.secnews.pl wp-content uploads 2011 05 whitepaper_antidebugging.pdf, (Jan. 1, 2011).

"International Application Serial No. PCT US2020 039122, International Preliminary Report on Patentability dated Mar. 3, 2022", 9 pgs.

* cited by examiner

HACKER-RESISTANT ANTI-DEBUG SYSTEM

TECHNICAL FIELD

Embodiments described herein generally relate to anti-debug systems, and more particularly, in an embodiment, but not by way of limitation, to hacker-resistant anti-debug systems.

BACKGROUND

Debug utilities of various kinds can be used to attach to an executing process which allows dynamic analysis of the executing process. This dynamic analysis permits the examination of the executing process by halting the execution of the process, examining the values of variables in the executing process, and determining the program flow of the executing process. This further permits a determination of whether a program is executing properly and/or why a program is not executing properly.

However, debug facilities are not normally permitted on some computer systems, such as production computer systems, and the use of such debug utilities on production systems can be used maliciously by hackers and other malfeasants to reverse engineer and/or do other damage to an executing process or system. There exist anti-debug techniques to prevent such malfeasance, but these techniques normally use internal operating system interfaces, and can thus be circumvented by the hackers by hooking these functions. That is, hooking or otherwise interfering with the operating system functions that are used to set or read a particular piece of memory to perform the anti-debug tasks. In this way, an attacker could circumvent the anti-debug strategy. Other anti-debug techniques directly check known flags in documented operating system structures to determine if a process is being debugged. However, as these flags are well known and not essential to the functioning of the debug system, they can be overwritten by hackers to hide their improper debug attempts. Other anti-debug attempts include searching executing processes for known debug utility names or anti-debug features.

More elaborate anti-debug strategies involve generating a child process via a parent process or other process to monitor the process being protected from debugging or preventing the protected process from attaching itself to a debug process. However, these solutions still give hints to the hacker or other adversary about the anti-debug strategy that is being employed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
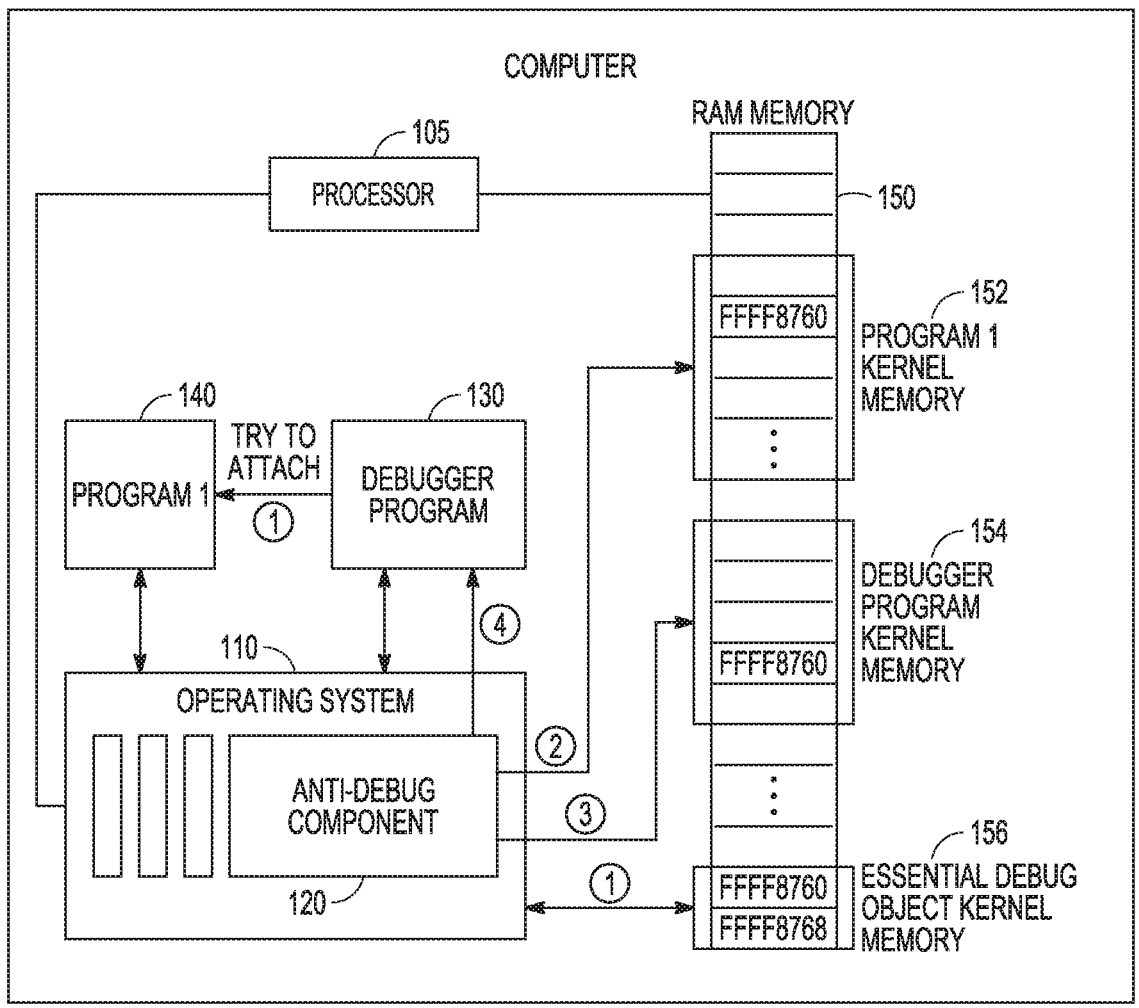
FIG. 1 is a block diagram illustrating an embodiment of an anti-debug system.

As noted above, prior anti-debug techniques normally use internal operating system interfaces, and thus can be circumvented by hooking these functions. To address this shortcoming, one or more embodiments disclosed herein do not rely on these operating system interfaces, and these embodiments instead directly interact with essential, usually undocumented, kernel objects in order to evade these countermeasures of malicious debug attempts. A kernel object is essential if the debug program, process, or tool simply cannot execute without it. In contrast, there are some objects that a debug program, process, or tool can still execute without, such as objects that simply provide notifications about the debug process.

Specifically, one or more anti-debug embodiments use operating system kernel objects. Most operating systems have one or more kernel objects that are, for one reason or another, not documented and therefore not commonly known and/or well-known. These undocumented kernel objects that are used by every executing process in a system can be analyzed via reverse engineering to determine which are essential for the debug process and therefore can be useful for an anti-debug system. An anti-debug system can then be created to directly set and read these kernel objects in processes to help hide, detect, and respond to improper debug attempts. Debug attempts in many operating systems create kernel objects in the process that is the target of the debug attempt, and references to those kernel objects are kept by the unauthorized or hacker process that is attempting the improper debug session. With this information, the anti-debug system can identify these hacker processes and take appropriate measures against these hacker processes. The anti-debug system can also hide these measures from the unauthorized process.

In a particular embodiment, a three-pronged approach to thwart improper debug attempts involves hiding the anti-debug process events from the unauthorized user, detecting an improper debug attempt before it has begun, and responding to those improper attempts by stopping the debug process. The anti-debug system directly reads and sets essential, undocumented kernel objects (that have been discovered via reverse engineering) involved in improper debug attempts, thereby making it difficult for an unauthorized user to circumvent the anti-debug system. Identification of the debugger processes via undocumented kernel object references stored by this improper process provides reliable detection and identification of the improper process. It also provides the ability to single out this improper process for direct response measures.

In short, the embodiments of this disclosure harden an operating system by hiding, detecting, and halting improper debugging attempts by an unauthorized user of the computer system in a manner that is more challenging to detect and prevent by the unauthorized user. The embodiments also do so by identifying the debugger process directly instead of relying on searching for processes run by known debuggers. That is, an anti-debug process detects debug attempts and sets hiding measures directly on kernel objects. This way hooking known operating system functions won't allow the attacker to detect or subvert anti-debugging measures.

In other embodiments, other detection strategies and response types are used. For example, instead of terminating a debugger process, the anti-debug system can execute more complex responses such as transmitting bogus instructions to the unauthorized user, throwing many exceptions, and/or giving the hacker a taste of his own medicine by turning around and hacking the unauthorized user.

In a particular embodiment, on a Microsoft Windows operating system, once a debug attempt is initiated, Windows creates a debug object in order to facilitate local inter process communication. By reverse engineering, one can determine the structure of the object table used by a process. This table holds all the objects that a process is currently utilizing. A debug object is present in the process object table of the process that is attempting to start a debug session. The process that is the target of the debug attempt also keeps reference to the debug object address in another kernel object. These kernel objects are useful for both detecting when a process is being debugged and for comparison with a debug object in another process object table. One can walk through the kernel objects associated with all the running process objects to detect a debug object in a process and then search the remaining process kernel object tables for an object that matches. Once the match is found, the debugging process can be terminated. In order for a process, like a debugger, to utilize a kernel object like the debug object, it must have an open handle to the object and consequently it must be in that process's object table. This makes the object table a reliable guide for debug ownership and more challenging for an attacker to hide or circumvent detection.

The following is a particular example of how an anti-debug system could be implemented on a Microsoft Windows operating system. This example assumes Windows 10 and a 64-bit processor. However, the embodiments of this disclosure could be implemented on any type of operating system.

The embodiment hides threads of the process whose applications are to be protected from debuggers by directly setting a "hide from debugger" bit in an ETHREAD object when the thread is created. This configures the Windows operating system so that it doesn't send debug events (e.g. load module, breakpoint, exceptions, termination, etc.) to a debug process. The ETHREAD flags structure can be found 0x6c8 from the start of ETHREAD object. The hide from debugger flag is the second bit.

To detect a debug attempt, an embodiment starts by keeping a running list of currently executing processes by adding a process creation callback or periodically walking through the active process list accessible in the EPROCESS object. When a debug attempt starts, a debug object is created, and a reference to it is stored in the EPROCESS object of the debug process. This reference to the debug process is stored 0x420 bytes from the start of the EPROCESS object in a field called "DebugPort." The reference holds the address to the object. Periodically, and also when a debug process is created, the embodiment checks for a non-zero debug port value, and if one exists, it stores it for later use. If a non-zero debug port value is found, a message is logged or some notification is created about this event. The process image file name can be found 0x450 bytes from the start of the EPROCESS address.

After the debug attempt is detected, the embodiment responds by killing the process that is attempting to debug the target process. First, the embodiment identifies the process that is attempting to debug the target process. The embodiment goes through an active process list checking all the objects in its process table. The object process table is 0x418 bytes from the start of EPROCESS object. A table code address is located 0x0008 bytes from the start of the object table. The table code address holds either two 64-bit values of zero followed by a list of handle objects, or the table code address holds two 64-bit values which can be shifted to the left by 8 bits, and that address holds two 64-bit values of zero followed by the list of handle objects. The first object entry in this table starts 0x10 bytes from the start of table address (every 16 bytes from here contains the next object entry). At each object entry address there is a value whose first 6 bytes are the last 6 bytes of the object header for the object. Shifting this value to the right by 8, twice, computes the actual object header address. The object body is then located 30 bytes from the object header address. This resulting value can be compared to the saved debug object value. If there is a match, then the debugging process has been found.

In order to terminate the debug process, once a match has been found, the debug process can be terminated with a Microsoft function ZwTerminate and passing in the matching process id or directly by setting certain kernel memory. This process id can be found in the unique process id located 0x2e0 from the start of the EPROCESS object. This can also be obtained through various Windows operating system functions.

Figure 2:
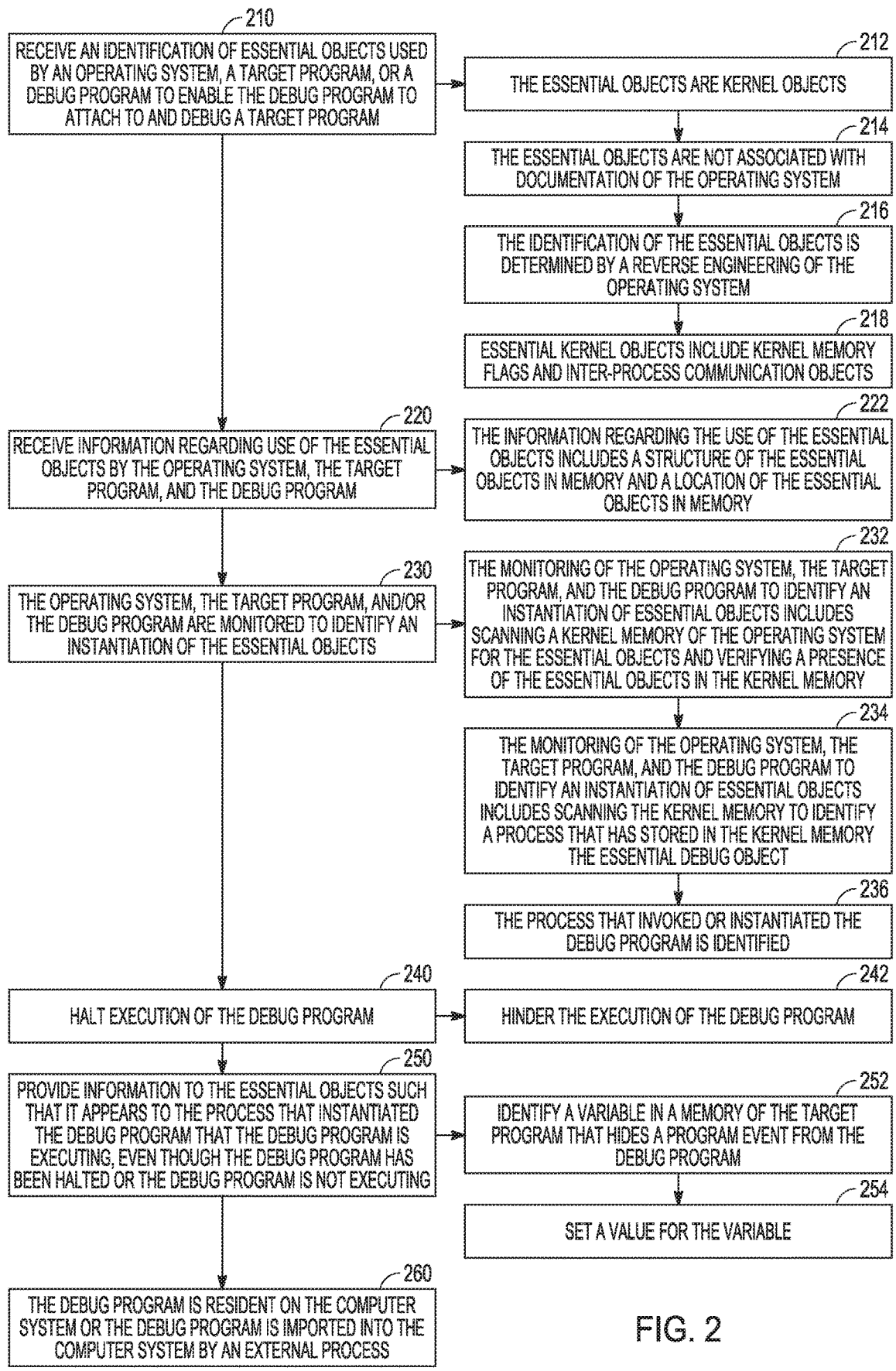
FIG. 2 is a block diagram illustrating features and operations of an embodiment of an anti-debug system.
Figure 3:
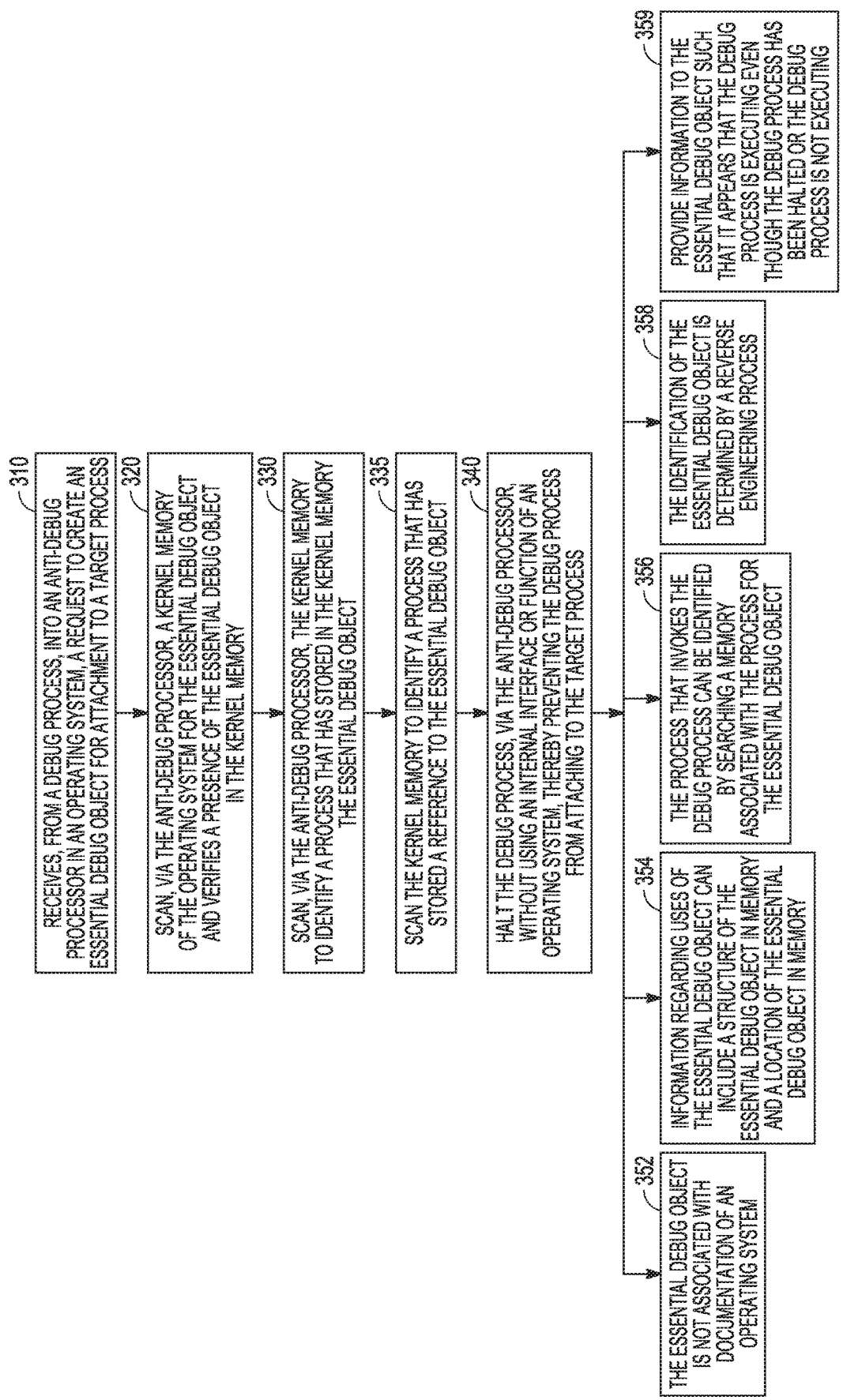
FIG. 3 is a block diagram illustrating features and operations of another embodiment of an anti-debug system.

FIGS. 1, 2, and 3 are block diagrams illustrating structures, operations, and features of an example system and method for anti-debugging. FIGS. 2 and 3 include a number of process blocks 210-260 and 310-359. Though arranged substantially serially in the example of FIGS. 2 and 3, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now to FIG. 2, at 210, a system and process receives an identification of essential objects used by an operating system, a target program, or a debug program to enable the debug program to attach to and debug a target program. These identifications include object names and kernel memory addresses. In most instances, as indicated at 212, these essential objects are kernel objects, and can be referred to as essential kernel objects. As indicated at 214, the identification of these essential objects used by the operating system, the target program, or the debug program is determined by a reverse engineering process of the operating system. Such a reverse engineering process is normally necessary because as indicated at 216, the essential objects, for one reason or another, are not associated with and/or mentioned in documentation of the operating system. Normally the reason for this lack of documentation is that the entity that created the operating system desires to keep the existence and identity of these essential objects from the general public for one reason or another. When these essential objects are essential kernel objects, the essential kernel objects can include kernel memory flags and inter-process communication objects (218). These kernel memory details can further be used in the identification of debug objects in the operating system. A reverse engineer can track these kernel memory details (e.g. flags, inter-process communication objects, etc.) during the normal course of their use by the operating system, target program and debug program to determine how they are used and which are essential and useful for reliable target program identification. This process is also useful in determining relevant parts of essential debug object structure.

At 220, the system receives information regarding the use of the essential objects by the operating system, the target program, and the debug program. As indicated at 222, the information regarding the use of the essential objects by the operating system, the target program, or the debug program can include a structure of the essential objects in memory and a location of the essential objects in memory. The structure of the essential objects permits an understanding of the essential objects and the functioning of the essential objects. For example, if the structure of an essential object indicates that the essential object is used for interprocess communications with a target program, that can be helpful in the determination that a debug process has been instantiated on the system. Also, the presence of these essential objects in the memory of the operating system, the memory of the target program, and/or the memory of the debug program can assist in the identification of a debug process on the system.

At 230, the operating system, the target program, and/or the debug program are monitored to identify an instantiation of the essential objects. If an instantiation of an essential object is identified, then it can be concluded that a debug program or process has been invoked on the system. As discussed above, the invocation of a debug process on certain production systems indicates the presence of malfeasant actions. More specifically, the monitoring of the operating system, the target program, and the debug program to identify an instantiation of one or more essential objects can include scanning a kernel memory of the operating system for the essential objects and verifying a presence of the essential objects in the kernel memory (232), and scanning the kernel memory to identify a process that has stored in the kernel memory the essential debug object (234). Additionally, as illustrated at 236, the process that invoked or instantiated the debug program can be identified. In an embodiment, this identification can be accomplished by searching memory that is associated with the process for one or more of the identified essential objects.

At 240, the system halts execution of the debug program. In an embodiment, this halting of the execution of the debug program is accomplished in a particular manner. Specifically, the halting of the execution of the debug program is accomplished via the essential objects without using an internal interface or function of the operating system. Moreover, the halting of the execution of the debug program is accomplished by using the information regarding the use of the essential objects and the identification of the one or more essential objects. If the debug component of this embodiment detects a reference to an essential debug object in the object table of a process that is not the target process, the program that started this process is now known reliably to be a debug program. Once identified, this program can be halted in various ways including directly setting essential debug object or debug program memory. As well, this embodiment could use a call to the operating system to halt the debug program that has been identified. Instead of halting the execution of the debug program, the system can merely hinder the execution of the debug program (242). Such an action may want to be taken by the system, for example, if the system wants to further investigate and acquire further information regarding the process and/or malfeasant who has invoked the debug process.

At 250, the system can provide information to the essential objects such that it appears to the process that instantiated the debug program that the debug program is executing, even though the debug program has been halted or the debug program is not executing. This permits the system to further investigate the malfeasant associated with the invoking of the debug program without the malfeasant becoming aware of such investigation. In a particular embodiment, as indicated at 252, the system identifies a variable in a memory of the target program that hides a program event from the debug program, and then at 254 sets a value for the variable. This variable can then be used to provide the information to the essential objects so that it appears that the debug program is executing when it is not. The setting of this variable causes the operating system to alter events that are sent, removing events of interest to the debug program.

As indicated at 260, the debug program is normally resident somewhere on the computer or operating system, or it can be a debug program that is imported into the computer system by an external process (the malfeasant).

Referring now to FIGS. 1 and 3, at 310, an operating system 110 executing on a processor 105 receives, from a debug process 130 in the operating system 110, a request to create an essential debug object 156 in memory 150 for attachment to a target process 140. At 320, the operating system 110 and/or process scans, via the anti-debug processor 120, a kernel memory of the operating system for the essential debug object and verifies a presence of the essential debug object in the kernel memory. At 330, the operating system 110 and/or process scans, via the anti-debug processor 120, the kernel memory 152 to identify a process that has stored in the kernel memory the essential debug object, which is the process targeted by the debug program. At 335, the operating system 110 and/or process scans, via the anti-debug processor 120, the kernel memory 154 to identify a process that has stored a reference to this essential debug object. This identifies the main process of the debug program. At 340, the operating system 110 and/or process halts the debug process, via the anti-debug processor 120, without using an internal interface or function of an operating system, thereby preventing the debug process from attaching to the target process.

As discussed above, in an embodiment, the essential debug object is not associated with documentation of an operating system (352). The creator of the operating system may have one or more reasons for not disclosing the existence of these essential objects via documentation. Information regarding uses of the essential debug object can include a structure of the essential debug object in memory and a location of the essential debug object in memory (354). As noted above, the structure and the location of essential debug objects can assist in identifying debug processes. The process that invokes the debug process can be identified by searching a memory associated with the process for the essential debug object (356). Since as noted at operation 352 the essential debug object is not associated with any documentation of an operating system, the identification of the essential debug object and its structure are normally determined by a reverse engineering process (358). At 359, the system provides information to the essential debug object such that it appears that the debug process is executing even though the debug process has been halted or the debug process is not executing. Once again, such actions by the system hide the actions of the system from the malfeasant who invoked the debug process, thereby permitting the system to further and more effectively investigate the actions of the malfeasant.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

In various embodiments, the anti-debug system (e.g., a computer) of FIG. 1 is configured to implement/perform the operations discussed in connection with the flowcharts shown in FIGS. 2-3. In some embodiments, the anti-debug system includes one or more components and/or modules for performing various operations discussed above. Depending on the embodiment, such components and/or modules may be implemented completely in hardware, software or as a combination of software and hardware.

The one or more components and/or modules can, and in some embodiments are, implemented fully in hardware, within or external to, the anti-debug system, e.g., as individual circuits. Alternatively, rather than being implemented as circuits, all or some of the modules may be implemented in software and stored in the memory, with the modules controlling operation of the anti-debug system to implement the functions corresponding to the modules when the modules are executed by a processor, e.g., processor 105 and/or processor 120. In still other embodiments, various modules are implemented as a combination of hardware and software.

In some embodiments, the anti-debug system may include one or more processors (e.g., processors 105 and 120), e.g., CPUs. In some embodiments, the one or more processors control the operation of the anti-debug system in accordance with the invention. In some embodiments, to control the anti-debug system, the processors may use information and/or routines including instructions included in the memory of the system.

While one or more steps of the methods shown in FIGS. 2-3, have been discussed as being performed by a processor, e.g., processor 105, 120, it should be appreciated that one or more of these steps may be, and in some embodiments are, implemented by dedicated circuitry, e.g., ASICs, FPGAs and/or other application specific circuits which improve the efficiency, accuracy and/or operational capability of the anti-debug system performing the method. Thus, in some embodiments, dedicated hardware, e.g., circuitry, and/or the combination of dedicated hardware and software are utilized in implementing one or more steps of the methods shown in FIGS. 2-3.

The techniques of various embodiments may be implemented using software, hardware and/or a combination of software and hardware. Various embodiments are directed to apparatus, e.g., an anti-debug system. Various embodiments are also directed to methods, e.g., a hacker-resistant anti-debug method. Various embodiments are also directed to machine, e.g., computer, readable medium, e.g., ROM, RAM, CDs, hard discs, etc., which include machine readable instructions for controlling a machine to implement one or more steps of a method. Some embodiments are directed a non-transitory computer readable medium embodying a set of software instructions, e.g., computer executable instructions, for controlling a computer or other device to perform the methods disclosed herein.

Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the various embodiments described above will be apparent to those skilled in the art in view of the above description. Such variations are to be considered within the scope.

The invention claimed is:

1. A process comprising:
   receiving, into a computer processor, an identification of essential objects used by an operating system, a target program, or a debug program to enable the debug program to attach to and debug the target program;
   receiving, into the computer processor, information regarding use of the essential objects by the operating system, the target program, and the debug program;
   monitoring the operating system, the target program, and the debug program to identify an instantiation of one or more of the essential objects; and
   halting execution of the debug program via the essential objects, and without using an internal interface of the operating system or a function of the operating system, based on one or more of the identification of the essential objects, the information regarding the use of the essential objects, and the identification of the instantiation of the one or more of the essential objects.

2. The process of claim 1, wherein the essential objects comprise essential kernel objects without which the target program or the debug program can execute.

3. The process of claim 2, wherein the essential kernel objects are not associated with documentation of the operating system.

4. The process of claim 2, wherein the essential kernel objects comprise kernel memory flags and inter-process communication objects.

5. The process of claim 1, wherein the information regarding the use of the essential objects by the operating system, the target program, and the debug program comprises a structure of the essential objects in a memory and a location of the essential objects in the memory.

6. The process of claim 1, further comprising identifying a process that invokes the debug program by searching a memory associated with the process for the one or more of the essential objects.

7. The process of claim 1, further comprising:
identifying a variable in a memory of the target program that hides a program event from the debug program; and
setting a value for the variable in the memory of the target program.

8. The process of claim 1, further comprising providing information to the essential objects such that it appears that the debug program is executing even though the debug program has been halted or the debug program is not executing.

9. The process of claim 1, wherein the essential objects halt execution of the debug program or hinder execution of the debug program.

10. The process of claim 1, wherein the debug program is resident on the computer processor or the debug program is imported into the computer processor by an external process.

11. The process of claim 1, wherein the identification of the essential objects used by the operating system, the target program, or the debug program is determined by a reverse engineering process.

12. The process of claim 1, wherein the monitoring the operating system, the target program, and the debug program to identify the instantiation of the one or more of the essential objects comprises:
scanning a kernel memory of the operating system for the essential objects and verifying a presence of the essential objects in the kernel memory; and
scanning the kernel memory to identify a process that has stored the essential objects in the kernel memory.

13. A process comprising:
receiving, from a debug process, into an anti-debug processor in an operating system, a request to create an essential debug object for attachment to a target process;
scanning, via the anti-debug processor, a kernel memory of the operating system for the essential debug object and verifying a presence of the essential debug object in the kernel memory of the operating system;
scanning, via the anti-debug processor, the kernel memory of the operating system to identify a process that has stored in the kernel memory of the operating system the essential debug object; and
halting the debug process in the operating system, via the anti-debug processor without using an internal interface of the operating system or a function of the operating system, thereby preventing the debug process in the operating system from attaching to the target process.

14. The process of claim 13, wherein the essential debug object is not associated with documentation of the operating system.

15. The process of claim 13, wherein the essential debug object halts execution of the debug process in the operating system or hinders execution of the debug process in the operating system.

16. The process of claim 13, further comprising identifying a process that invokes the debug process in the operating system by searching a memory associated with the process for the essential debug object.

17. The process of claim 13, wherein an identification of the essential debug object is determined by a reverse engineering process.

18. The process of claim 13, comprising providing information to the essential debug object such that it appears that the debug process in the operating system is executing even though the debug process in the operating system has been halted or the debug process in the operating system is not executing.

19. A computer system comprising:
an operating system;
a memory coupled to the operating system; and
an anti-debug processor coupled to the operating system;
wherein the anti-debug processor is operable to:
receive, from a debug process, in the operating system, a request to create an essential debug object for attachment to a target process;
scan a kernel memory of the operating system for the essential debug object and verify a presence of the essential debug object in the kernel memory of the operating system;
scan the kernel memory of the operating system to identify a process that has stored in the kernel memory of the operating system the essential debug object; and
halt the debug process in the operating system, without using an internal interface of the operating system or a function of the operating system, thereby preventing the debug process in the operating system from attaching to the target process.

20. The computer system of claim 19, wherein the anti-debug processor is further operable to provide information to the essential debug object such that it appears that the debug process in the operating system is executing even though the debug process in the operating system has been halted or the debug process in the operating system is not executing.

* * * * *